(12) United States Patent
Stimpson et al.

(10) Patent No.: US 10,771,918 B1
(45) Date of Patent: Sep. 8, 2020

(54) DYNAMIC GEOFENCING TECHNIQUES FOR GPS ENABLED COMMUNICATION DEVICES

(71) Applicant: Republic Wireless, Inc., Raleigh, NC (US)

(72) Inventors: Jesse Stimpson, Fuquay Varina, NC (US); James Mulcahy, Raleigh, NC (US)

(73) Assignee: Republic Wireless, Inc., Raleigh, NC (US)

( * ) Notice: Subject to any disclaimer, the term of this patent is extended or adjusted under 35 U.S.C. 154(b) by 0 days.

(21) Appl. No.: 16/783,247

(22) Filed: Feb. 6, 2020

(51) Int. Cl.
*H04W 24/00* (2009.01)
*H04W 4/021* (2018.01)
*H04W 4/02* (2018.01)

(52) U.S. Cl.
CPC .......... *H04W 4/021* (2013.01); *H04W 4/023* (2013.01)

(58) Field of Classification Search
CPC .............................. H04W 4/021; H04W 4/023
USPC ...................................................... 455/456.1
See application file for complete search history.

(56) References Cited

U.S. PATENT DOCUMENTS

| | | | |
|---|---|---|---|
| 9,965,728 B2* | 5/2018 | Perold | H04W 4/80 |
| 2015/0176998 A1* | 6/2015 | Huang | H04W 4/021 701/400 |
| 2017/0289074 A1* | 10/2017 | Joo | H04L 51/04 |

* cited by examiner

*Primary Examiner* — Amancio Gonzalez
(74) *Attorney, Agent, or Firm* — Gregory Stephens

(57) ABSTRACT

Techniques are disclosed for managing a spontaneously created geofenced area among a plurality of communication devices communicable with a communication server. The communication server receives, from a location enabled first communication device, an instruction to create a geofence around a location enabled second communication device. Upon receiving location data from the first and second communication devices, the communication server compares the location data of the first and second communication devices to determine how close they are to one another. When the first and second communication devices are within a predetermined distance of one another, the communication server creates a geofence around the second communication device. The communication server will then notify the first communication device when the second communication device ventures beyond the boundary of the geofence.

12 Claims, 6 Drawing Sheets

200

260

270

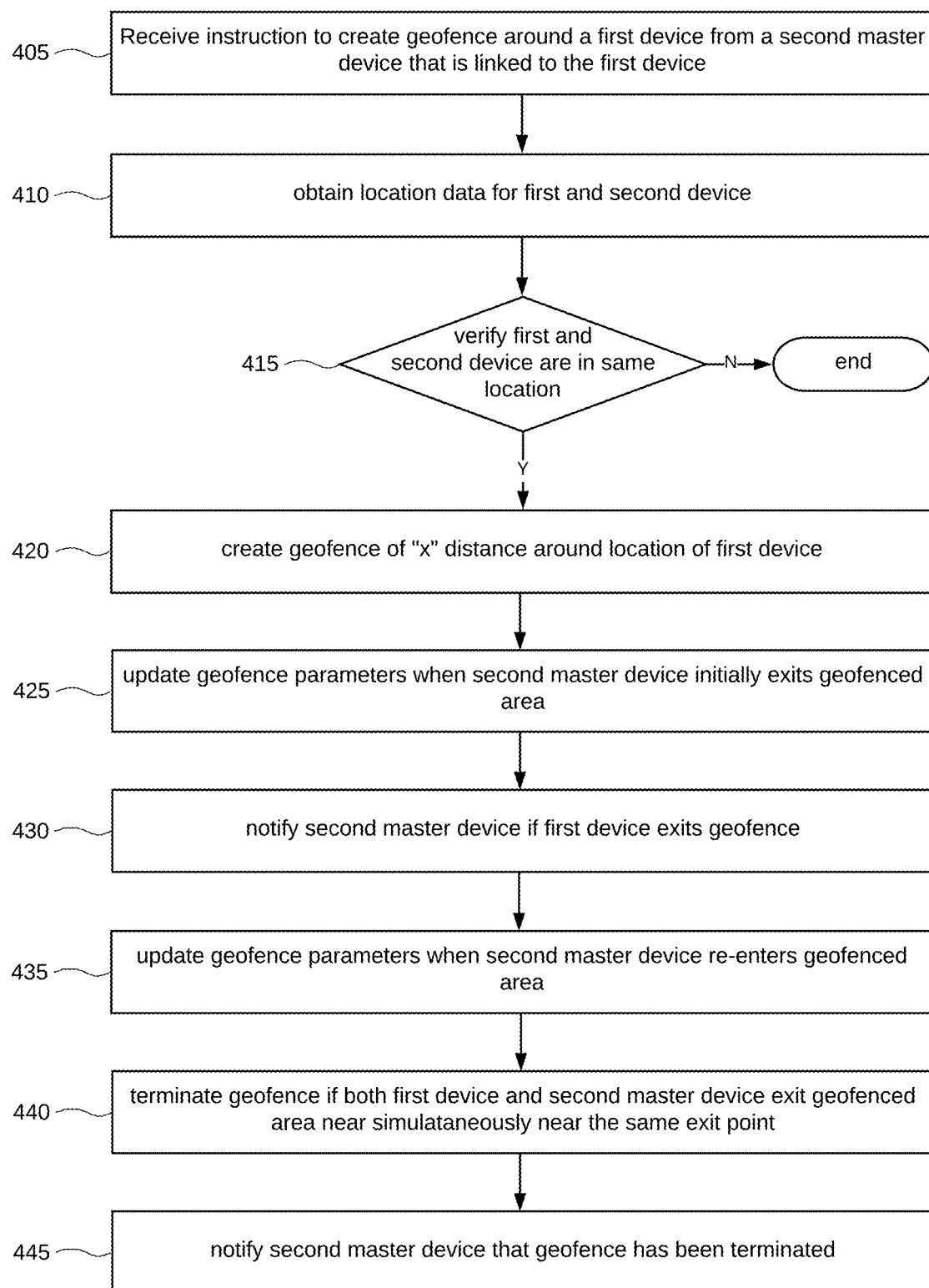

600

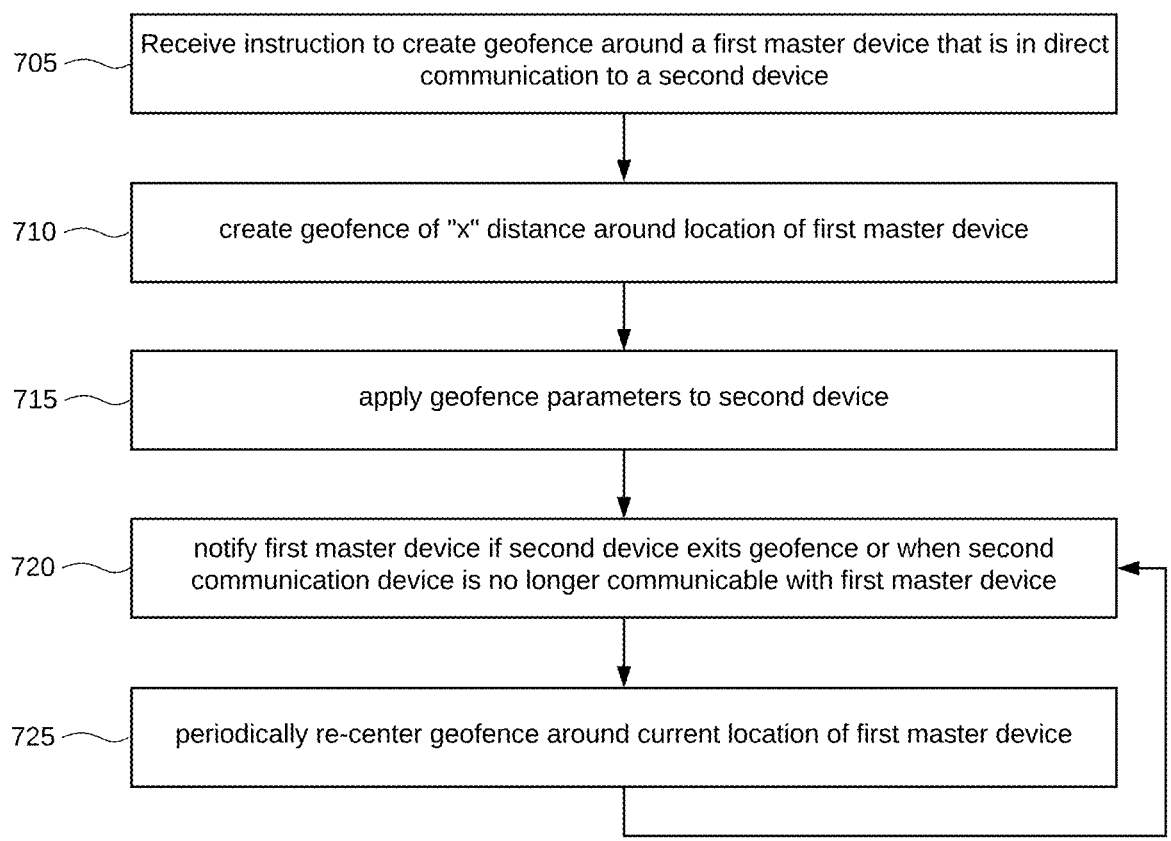

DYNAMIC GEOFENCING TECHNIQUES FOR GPS ENABLED COMMUNICATION DEVICES

TECHNICAL FIELD

Examples described herein are generally related to techniques for providing tracking location data among a plurality of location enabled communication devices communicable with a communication server.

BRIEF DESCRIPTION OF THE DRAWINGS

FIG. 4 is a logic flow diagram describing a process for dynamically setting and managing a geofenced area for a portable communication device according to an embodiment of the invention.

FIG. 7 is another logic flow diagram describing a process for managing a dynamic geofence between screenless communication devices according to an embodiment of the invention.

DETAILED DESCRIPTION

The systems and methods of the invention may be embodied in and performed by portable communication devices in conjunction with network based communication server(s) and other related components (e.g., databases), and software instructions executed by some or all of such devices and components, as will be explained in detail below. The different types of networks contemplated herein include, for example, IP based cellular mobile networks, and IP data networks, such as the Internet or other IP-based networks, including wide area networks, local area networks, and combinations thereof that include wireless 802.11 and wireless IP cellular means of access over a wide ranging spectrum of bandwidth.

As used herein the term "portable communication device" generally indicates a physical device (e.g., endpoint) intended for, among other things, exchanging location data with other communication devices, computer devices, or network endpoints over one or more intra- and inter-connected communication networks. A portable communication device may be equipped with multiple RF transceivers including an 802.11 WiFi transceiver, a cellular banded transceiver, Bluetooth transceiver, a LoRa® transceiver and near field communication (NFC) capability. Long Range (LoRa) is a wireless technology mainly targeted for M2M and IoT networks. Other similar RF transceivers configured to use various frequency ranges may also be implemented on the portable communication device as they are developed. For the sake of clarity, a portable communication device may encompass a computer device equipped with at least one RF radio or Ethernet connection. This includes, but is not necessarily limited to mobile phones, smartphones, tablets, laptops, smartwatches, IoT devices, desktops, and other special purpose hardware such as, for instance, the aforementioned Relay® device by Republic Wireless®. Other examples may be understood to those of ordinary skill in the art.

Figure 1:
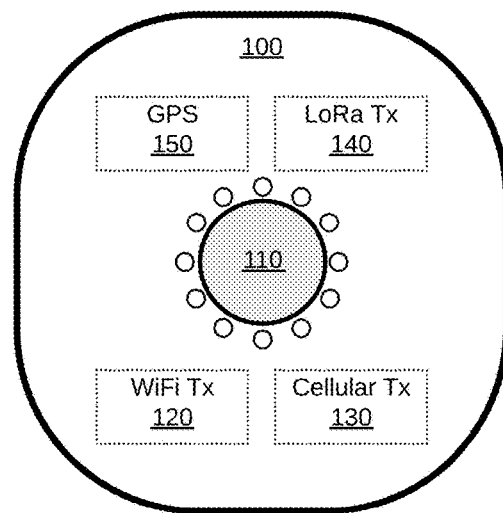
FIG. 1 illustrates a portable communication device according to an embodiment of the invention.

FIG. 1 illustrates a portable communication device 100 according to an embodiment of the invention. In this example, the communication device 100 is screenless and includes at least one input button 110. The portable communication device 100 from an internal component point of view may comprise one or more processors (not shown) for executing instructions, processing data, and controlling the functions of the portable communication device 100. A generalized software component (not shown) may include computer code executable by the processors for controlling and executing the various functions of the portable communications device 100. The software component may also represent downloaded or pre-loaded software applications. The software component may be stored in a storage component (not shown) which may include random access memory (RAM), Read-only memory (ROM), and/or removable storage media. The storage component may also encompass mechanisms like subscriber identity module (SIM) adapted to receive and interface with removable or embedded SIM cards or e-SIMS (not shown). The portable communication device 100 may be powered by a power source such as, for instance, a battery (not shown) that drives the components needing power like the processor(s) and a plurality of RF transceivers 120, 130, 140. The RF transceivers 120, 130, 140 may be embedded into chip sets for cellular communication 130, 802.11 WiFi communication 120, LoRa® 140 and Bluetooth (not shown) communication. A global positioning system (GPS) module 150 may also be included to receive and provide location coordinate data that may be integrated into location based services provided by the portable communication device 100 independent of or in conjunction with a communication server. The Relay® device sold by Republic Wireless® is an example of a communication device that includes the components described above.

Figure 2A:
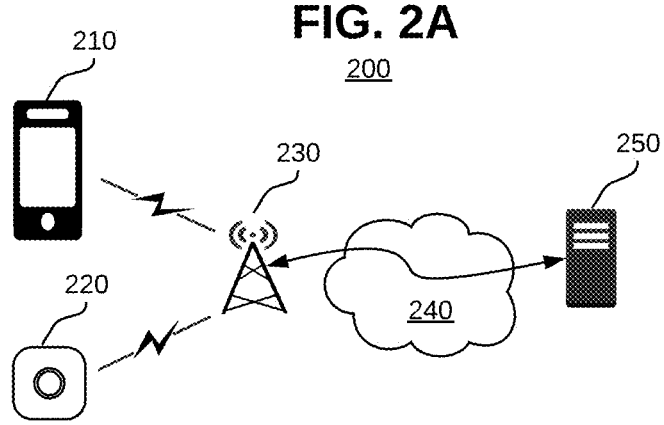
FIG. 2A illustrates a first networked environment according to an embodiment of the invention.

FIG. 2A illustrates a first networked environment 200 according to an embodiment of the invention. The networked environment 200 may include portable communication devices 210, 220 operatively coupled to an IP network 240 by way of one or more mobile radio access networks (MRANs) 230 accessible via cellular basestation tower(s).

The MRANs 230 have backhaul IP connectivity to the Internet 240 that provide connectivity with a communication server 250. In certain embodiments, the MRANs include cellular networks or portions of cellular networks based on a variety of circuit switched and/or IP data protocols such as, but not limited to, Global System for Mobile Communications (GSM), Code Division Multiple Access (CDMA), General Packet Radio Service (GPRS), Enhanced Data for GSM Evolution (EDGE), Evolution-Data Optimized (EV-DO), High Speed Packet Data (HSPD), High Speed Downlink Packet Access (HSDPA), Long-Term Evolution (LTE), Voice-over Long-Term Evolution (VoLTE), Wideband Code Division Multiple Access (WCDMA), Universal Mobile Telecommunications System (UMTS), or High Rate Packet Data (HRPD) and/or any other existing or developed/developing cellular network IP standards—e.g., 5G.

Figure 2B:
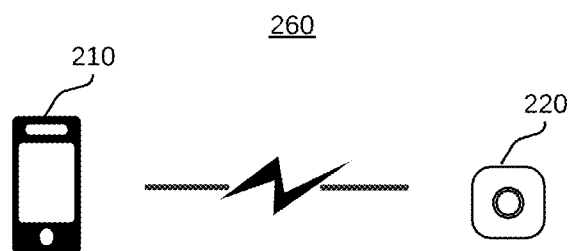
FIG. 2B illustrates a second networked environment according to an embodiment of the invention.

FIG. 2B illustrates a second networked environment 260 according to an embodiment of the invention. The networked environment 200 may include portable communication devices 210, 220. In this embodiment, both portable communication devices 210, 220 include a wireless transceiver capable of peer to peer communication. One of the portable communication devices (e.g., 210) may be a smartphone. The other portable communication device may be a screenless device like the Relay® device sold by Republic Wireless®. One such example of a peer to peer wireless transceiver may be a LoRa® transceiver and protocol. Long Range (LoRa) is a wireless technology mainly targeted for M2M and IoT networks. LoRa may have an effective range of 1-10 kilometers depending on environmental conditions. The Relay® device sold by Republic Wireless® incorporates a LoRa transceiver.

Figure 2C:
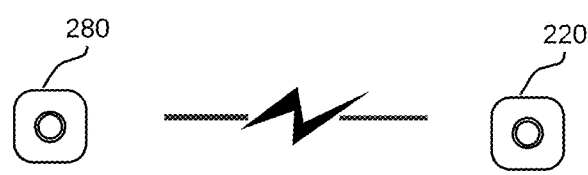
FIG. 2C illustrates a third networked environment according to an embodiment of the invention.

FIG. 2C illustrates a second networked environment 260 according to an embodiment of the invention. The networked environment 200 may include portable communication devices 280, 220. In this embodiment, both portable communication devices 2810, 220 may be screenless devices like the Relay® device sold by Republic Wireless®. Users may use verbal commands to program or configure the device for certain tasks including geofence creation.

Figure 3:
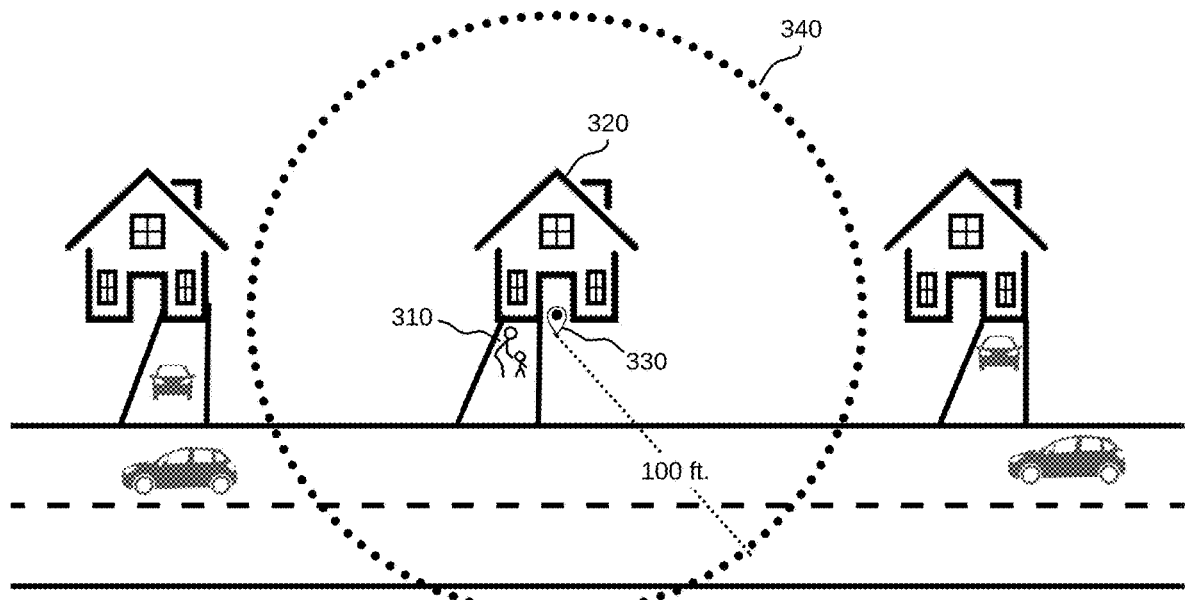
FIG. 3 is a first geofenced area according to an embodiment of the invention.

FIG. 3 is a first geofenced area 300 according to an embodiment of the invention. In this scenario, a parent 310 is dropping their child at a friend's house 320 for a visit. In this scenario the child is equipped with a portable communication device (e.g., 220 of FIG. 2) and the parent is equipped with another portable communication device (e.g., 210 of FIG. 2). Both communication devices 210, 220 are communicable with communication server 250 as described in FIG. 2. In addition, portable communication device 250 has linked or grouped the parent communication device 210 with the child portable communication device 220. Through a software application executable on the parent's portable communication device 210, the parent sets a location marker 330 indicative of the friend's house 320. The location may be obtained from a GPS module within portable communication device 210. The parent through the software application may then set a radius around that location marker to create a virtual geofenced area 340. For instance, the radius may be set at 100 feet which adequately covers the area in and around the friend's house 320.

Communication server 250 may then store the location marker and the radius provided by portable communication device 210 to set the geofenced area 340. Communication server 250 may then periodically poll and retrieve the GPS coordinates for the child's portable communication device 220. Communication server 250 may then compare the GPS coordinates of the child's portable communication device 220 with the GPS coordinates of the static location marker entered by the parent's portable communication device 210. If the calculated distance between the two locations exceeds the radius entered by the parent's portable communication device 210, communication server immediately notifies the parent's portable communication device 210 that the child's portable communication device 220 has breached the geofenced boundary set by the parent. Based on the notification, the parent may take action to contact the child. The system may also be configured to automatically alert the child's portable communication device 220 when they leave the geofenced area through an audible alert or the like.

FIG. 4 is a logic flow diagram describing a process 400 for dynamically setting and managing a geofenced area for a portable communication device according to an embodiment of the invention. In this embodiment, two co-located communication devices are linked to one another. A dynamic geofence perimeter is then established around the co-located area and assigned to one of the communication devices (e.g., a child's device). Thereafter, the other communication device (e.g., a parent's device) leaves the geofenced area leaving the other communication device bounded within the geofence. Should that communication device breach the geofence boundary, a notification may be sent to the companion communication device.

Process 400 may begin when a communication server receives an instruction to create a geofence around a first communication device at step 405. The instruction may come from a software application executing on a second master communication device that is linked with first communication device from the perspective of communication server. The communication server then obtains location data for both the first and second communication devices at step 410. This may be achieved by polling each device with an instruction to send the location data back to the communication server. The communication server then compares the location data for the first communication device to location data for the second communication device to verify the two devices are in relatively close proximity (e.g., 50 feet) to one another at decision step 415. The process 400 is configured to allow creation of a dynamic geofence only when the two communication devices are co-located such as, for instance, when a parent drops their child at a friend's house, a birthday party location or the like.

If the two communication devices are in close enough proximity the communication server will use the location of the first communication device and build a geofence centered around its location at step 420. The exact dimensions or radius of the geofence may be set in the application running on the second communication device. If not manually set, a default value (e.g., 100 feet) may be used. As a point of reference, a 118 foot radius yields a geofence of one acre.

At step 425, the communication server updates the status of the geofence when the second communication device exits the geofenced area. For instance, the status switches from a static state following creation to an active monitoring state. Once in the active monitoring state, the communication server periodically polls the first communication device for its location data and compares it to the geofenced area. If the most recent location data for the first communication device exceeds the boundary for the geofenced area, a notification or alert is sent to the second communication device at step 430. This process continues until the second communication device re-enters the geofenced area as the communication server also periodically polls the second communication device for its location data and compares it to the geofenced area. When the second communication device re-enters the geofenced area the status of the geofence is updated to together at step 435 to indicate that the first and second communication devices are again in close proximity to one another. For instance, the parent may have returned to pick up their child thereby putting them into close proximity once again.

At this point, both the first and second communication devices may exit the geofenced area together. This would likely occur if the parent and child were to leave where they were to go somewhere else. Should the first and second communication devices exit the geofenced area near simultaneously and at nearly the same point the communication server will automatically terminate the temporary geofence at step 440 followed by sending a notification to the second communication device that the temporary geofence has been terminated at step 445.

The process 400 thus allows a parent (second communication device) to create a temporary and dynamic geofence for a child (first communication device) that will automatically disappear when the parent and child reunite and both exit the geofenced area together.

Figure 5A:
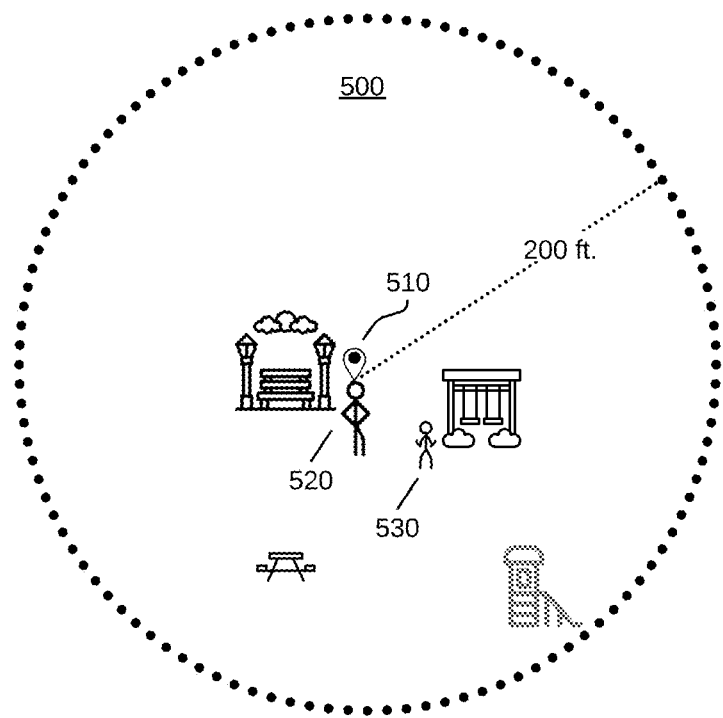
FIG. 5A is a second geofenced area according to an embodiment of the invention.

FIG. 5A is a second geofenced area 500 according to an embodiment of the invention. In this scenario, a parent 520 and child 530 are visiting a park. Similar to previous embodiments the child 530 possesses a first communication device 220 and the parent 520 possesses a second communication device 210. Both communication devices 210, 220 are communicable with a communication server 250. The parent's device (second communication device 210) includes an application and interface that permits it to instruct the communication server 250 to set up and manage a geofenced area and link it with the first communication device 220. For instance, the parent 520 via second communication device 210 instructs communication server 250 to create a geofenced area around the location of the second communication device 210. In addition, the user (e.g., parent 520) of the second communication device 210 may configure the area of the geofence by specifying the radius of the geofence (e.g. 200 feet). Using a voice recognition interface, the parent 520 may speak the command, "Create 200 foot geofence around my device and link it to my child's device." This command is received by communication server 250 which then determines the identities and locations of the first 220 and second 210 communication devices and creates the 200 foot geofence around the second communication device. Communication server 250 may be pre-configured with the identities and relationships between and among the communication devices associated with the user and their account. This information allows communication server 250 to perform the requested command.

Once the requested geofence has been created around the location 510 of second communication device 210, communication server automatically and periodically polls both communication devices for their location information. The two locations are compared to one another and a distance between the two is calculated. If that distance exceeds the specified geofenced distance, an alert is sent to the second communication device indicating that the first communication device is outside the geofenced boundary.

Figure 5B:
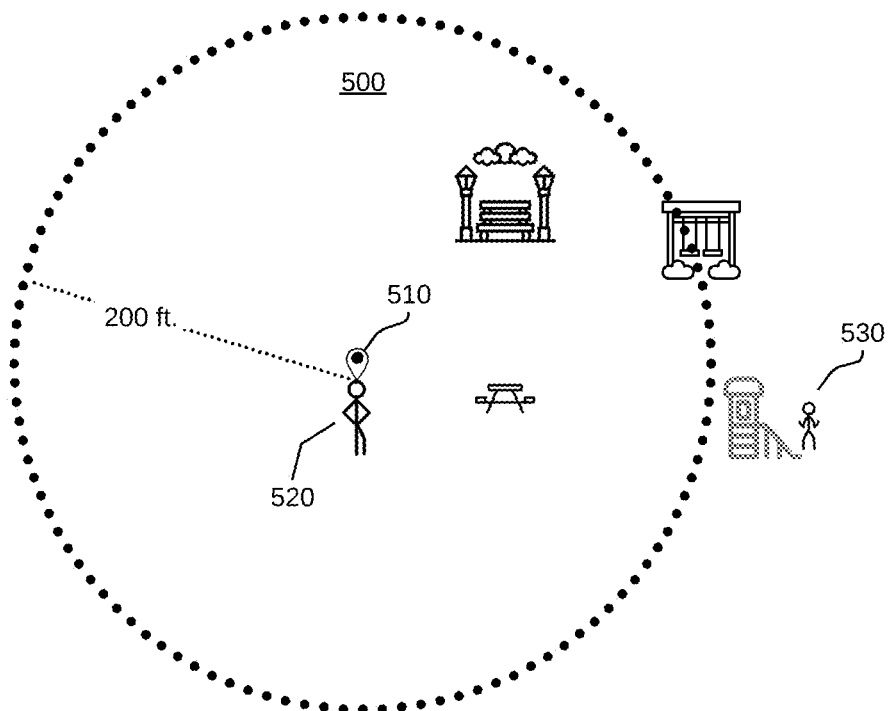
FIG. 5B is a recalibration of the second geofenced area according to an embodiment of the invention.

FIG. 5B is a recalibration of the second geofenced area 500 according to an embodiment of the invention. One of the advantages of this embodiment is that the geofenced area automatically gets updated whenever the second communication device 210 moves. Put another way, the geofenced area remains centered on the second communication device 210 even if that device moves its location. This is extremely valuable when a parent 520 and child 530 are traveling together but may get separated. At some point, the parent 520 moves away from the bench and the child 530 has moves toward the slide shown in FIG. 5B. This new orientation results in a distance between the first communication device 220 (child 530) and second communication device 210 (parent 520) exceeding the geofence. Communication server 250 then alerts the second communication device 210 as to this condition.

Figure 6:
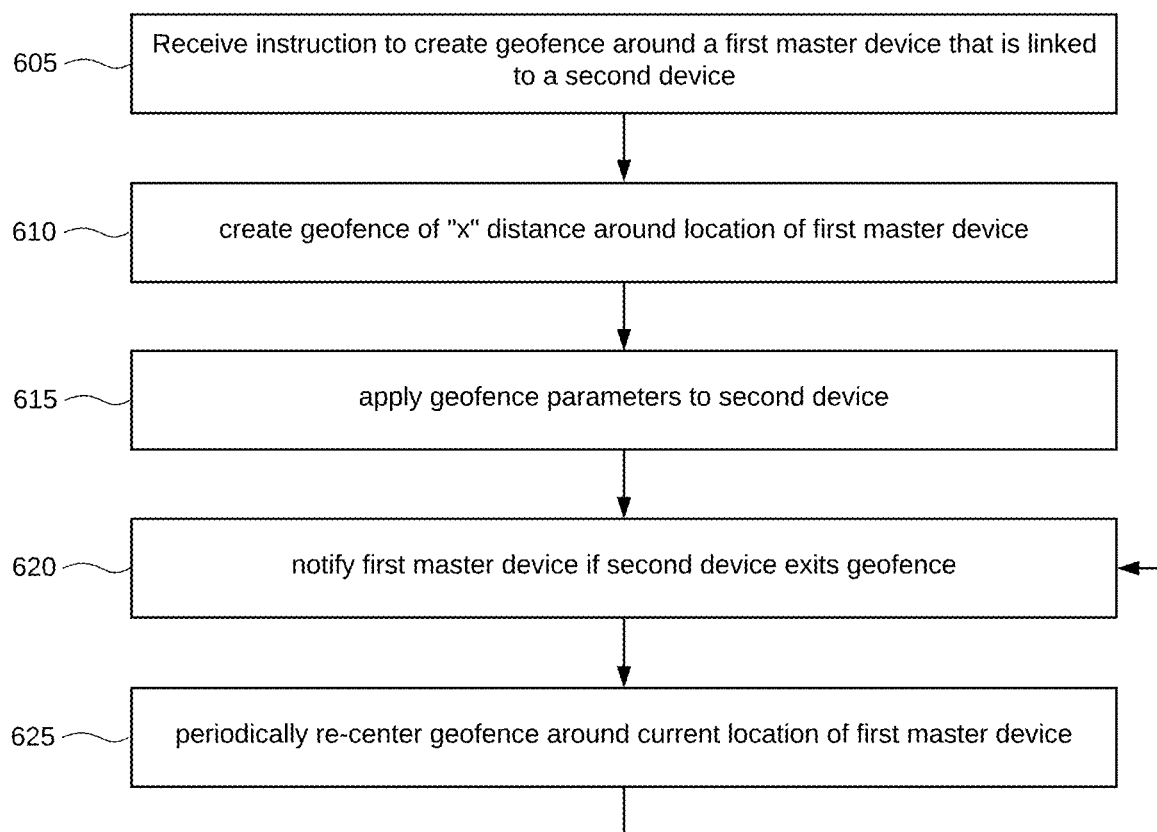
FIG. 6 is another logic flow diagram describing a process for managing a dynamic geofence according to an embodiment of the invention.

FIG. 6 is another logic flow diagram describing a process 600 for managing a dynamic geofence according to an embodiment of the invention. In this embodiment, two co-located communication devices are linked to one another. A dynamic geofence perimeter is then established around the co-located area and assigned to one of the communication devices (e.g., a parent's device). When the other communication device (e.g., a child's device) leaves the geofenced area, a notification may be sent to the parent's communication device.

Process 600 may begin when a communication server receives an instruction to create a geofence around a first communication device (e.g., a parent's device) at step 605. A communication server links the geofence to the second communication device (e.g., a child's device). Part of the instruction to create the geofence may include a distance parameter specifying the size or area of the geofence. For instance, the instruction may provide for a geofence with a radius of 200 feet. In the absence of a specified radius, communication server 250 may implement a default radius value (e.g., 100 feet). The default radius may be reset by the user if desired. The communication server then creates the specified requested geofence centered around the first communication device at step 610. The geofence parameters are then applied to the second communication device by the communication server at step 615. Thereafter, the communication server automatically and periodically polls both communication devices for their location information. The two locations are compared to one another and a distance between the two is calculated. If that distance exceeds the specified geofenced distance, an alert is sent to the first communication device indicating that the second communication device is outside the geofenced boundary at step 620. The geofenced area is continually updated and re-centered around the first communication device at step 625 every time a new location for the first communication device is received by the communication server.

FIG. 7 is another logic flow diagram describing a process 700 for managing a dynamic geofence between screenless communication devices according to an embodiment of the invention. In this embodiment, two co-located screenless communication devices are linked to one another. A dynamic geofence perimeter is then established around the co-located area and assigned to one of the communication devices (e.g., a parent's device). When the other communication device (e.g., a child's device) leaves the geofenced area or otherwise loses connectivity to the parent's communication device, a notification may be sent to the parent's communication device.

Process 700 may begin when a first communication device (e.g., a parent's or child's device) receives an instruction to create a geofence around a second communication device (e.g., parent's or child's device) at step 705. The instruction may be a verbal command entered into the first communication device to set a defined geofence area around the second communication device. Both devices are communicable with one another and can pass location data (e.g., GPS coordinates) over a peer to peer transceiver and protocol. The verbal command may also define the size of the geofence. For instance, a parent may speak a command like, "create 200 feet geofence around Billy's device." This command presupposes that the user's device and "Billy's" device are known to one another and in communication with one another. In the absence of a specified radius, the first communication device may implement a default radius value (e.g., 100 feet). The default radius may be reset by the user if desired. The first communication device then creates the specified requested geofence centered around either the first or second communication device at step 710. The geofence parameters are then applied to the second communication device at step 715. Thereafter, the first communication device automatically and periodically polls the second communication device for its location information. The second communication device location information is compared to the first communication device location information and a distance between the two is calculated. If that distance exceeds the specified geofenced distance, an alert is rendered on the first communication device indicating that the second communication device is outside the geofenced boundary at step 720. Additionally, if the first and second communication devices lose peer to peer connectivity an alert is rendered on the first communication device indicating a loss of connectivity with the second communication device. The geofenced area is continually updated and re-centered around the first (or second) communication device at step 725 every time a new location for the first (or second) communication device is determined.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled", "connected", or "capable of being coupled" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

The invention claimed is:

1. A method of tracking location data among a plurality of communication devices communicable with a communication server, comprising:
   in the communication server:
      receiving, from a location enabled first communication device, an instruction to create a geofence around a location enabled second communication device;
      requesting location data for both the first and second communication devices;
      receiving the requested location data from the first and second communication devices;
      comparing the location data of the first and second communication devices to determine how close they are to one another;
      creating a geofence around the second communication device when the first and second communication devices are within a predetermined distance of one another wherein the geofence is in one of two states, the two states being paused and active wherein the paused state is characterized by the first and second communication devices both being within the boundary of the geofence, and the active state is characterized by the first communication device being within the boundary of the geofence and the second communication device being beyond the boundary of the geofence; and notifying the first communication device when the second communication device ventures beyond the boundary of the geofence.

2. The method of claim 1, further comprising:
receiving from the first communication device a specific radius for the geofence in the instruction to create a geofence around a location enabled second communication device; and
setting a predetermined default radius for the geofence when a specific radius for the geofence is not received from the first communication device in the instruction to create a geofence around a location enabled second communication device.

3. The method of claim 1, further comprising notifying the first communication device each time there is a change in the status of the geofence.

4. The method of claim 1, further comprising:
terminating the geofence when the first and second communication devices transition from both being within the boundary of the geofence to both being beyond the boundary of the geofence near simultaneously.

5. A communication system configured to track location data among a plurality of communication devices communicable with a communication server, comprising:
a communication server comprising one or more processors configured to execute instructions to:
receive, from a location enabled first communication device, an instruction to create a geofence around a location enabled second communication device;
request location data for both the first and second communication devices;
receive the requested location data from the first and second communication devices;
compare the location data of the first and second communication devices to determine how close they are to one another;
create a geofence around the second communication device when the first and second communication devices are within a predetermined distance of one another wherein the geofence is in one of two states, the two states being paused and active wherein the paused state is characterized by the first and second communication devices both being within the boundary of the geofence, and the active state is characterized by the first communication device being within the boundary of the geofence and the second communication device being beyond the boundary of the geofence; and
notify the first communication device when the second communication device ventures beyond the boundary of the geofence.

6. The communication system of claim 5, the communication server further comprising one or more processors configured to execute instructions to:
receive from the first communication device a specific radius for the geofence in the instruction to create a geofence around a location enabled second communication device; and
set a predetermined default radius for the geofence when a specific radius for the geofence is not received from the first communication device in the instruction to create a geofence around a location enabled second communication device.

7. The communication system of claim 5, the communication server further comprising one or more processors configured to execute instructions to:
notify the first communication device each time there is a change in the status of the geofence.

8. The communication system of claim 5, the communication server further comprising one or more processors configured to execute instructions to:
terminate the geofence when the first and second communication devices transition from both being within the boundary of the geofence to both being beyond the boundary of the geofence near simultaneously.

9. A non-transitory computer-readable medium comprising a plurality of instructions that when executed enable processing circuitry to execute instructions to track location data among a plurality of communication devices communicable with a communication server, the instructions to:
receive, from a location enabled first communication device, an instruction to create a geofence around a location enabled second communication device;
request location data for both the first and second communication devices;
receive the requested location data from the first and second communication devices;
compare the location data of the first and second communication devices to determine how close they are to one another;
create a geofence around the second communication device when the first and second communication devices are within a predetermined distance of one another wherein the geofence is in one of two states, the two states being paused and active wherein the paused state is characterized by the first and second communication devices both being within the boundary of the geofence, and the active state is characterized by the first communication device being within the boundary of the geofence and the second communication device being beyond the boundary of the geofence; and
notify the first communication device when the second communication device ventures beyond the boundary of the geofence.

10. The non-transitory computer-readable medium of claim 9 further comprising a plurality of instructions that when executed enable processing circuitry to:
receive from the first communication device a specific radius for the geofence in the instruction to create a geofence around a location enabled second communication device; and
set a predetermined default radius for the geofence when a specific radius for the geofence is not received from the first communication device in the instruction to create a geofence around a location enabled second communication device.

11. The non-transitory computer-readable medium of claim 9, further comprising a plurality of instructions that when executed enable processing circuitry to:
notify the first communication device each time there is a change in the status of the geofence.

12. The non-transitory computer-readable medium of claim 9 further comprising a plurality of instructions that when executed enable processing circuitry to:
terminate the geofence when the first and second communication devices transition from both being within the boundary of the geofence to both being beyond the boundary of the geofence near simultaneously.

* * * * *